United States Patent [19]

Donath et al.

[11] Patent Number: 5,392,221
[45] Date of Patent: Feb. 21, 1995

[54] PROCEDURE TO MINIMIZE TOTAL POWER OF A LOGIC NETWORK SUBJECT TO TIMING CONSTRAINTS

[75] Inventors: Wilm E. Donath, Pleasantville; Wing K. Luk, Yorktown Heights; Donald T. Tang, Mt. Kisco, all of N.Y.

[73] Assignee: International Business Machines Corporation, Armonk, N.Y.

[21] Appl. No.: 714,027

[22] Filed: Jun. 12, 1991

[51] Int. Cl.$^6$ .............................................. G06F 15/60
[52] U.S. Cl. ................................... 364/489; 364/488
[58] Field of Search ................ 364/488, 489, 490, 491

[56] References Cited

U.S. PATENT DOCUMENTS

| | | | |
|---|---|---|---|
| 3,702,003 | 10/1972 | Ramirez, Jr. et al. | 364/489 |
| 4,263,651 | 4/1981 | Donath et al. | 364/491 |
| 4,698,760 | 10/1987 | Lembach et al. | 364/490 |
| 4,811,237 | 3/1989 | Putatunda et al. | 364/489 |
| 4,827,428 | 5/1989 | Dunlop et al. | 364/491 |
| 4,882,690 | 11/1989 | Shinsha et al. | 364/490 |

OTHER PUBLICATIONS

"Analytical Power/Timing Optimization Technique for Digital System" by Ruehli et al., IEEE 14th Design Automation Conf., 1977, pp. 142–146.
"Signal Delay in General RC Networks with Application to Timing Simulation of Digital Integrated Circuits" by Lin et al., IEEE 1984 Conf. on Advanced Research in VLSI, M.I.T., pp. 93–99.
J. Mavor et al., Introduction to MOS LSI Design, Chapter 3, Addison–Wesly Publication Company, 1983, pp. 79–85.
"PHILO-A VLSI Design System" by R. Donze et al., IEEE 19th Design Automation Conf., 1982, pp. 163–169.
"Tilos: A Posynomial Programming Approach to Transistor Sizing", Fishburn et al.
"Optimization of Digital MOS VLSI Circuits", Matson, 1985.
"Signal Delay in General RC Networks with Application to Timing Simulation of Digital Integrated Circuits", Lin et al., 1984.
"Timing Analysis for $\eta$MOS VSI", Jouppi, 1983.
"Processing for Selecting Circuits with Optimum Power and Area Requirements", Linville, et al., 1975.
"Analytical Power/Timing Optimization Technique for Digital System", Ruehli, et al., 1977.

*Primary Examiner*—Vincent N. Trans
*Attorney, Agent, or Firm*—Sterne, Kessler, Goldstein & Fox

[57] ABSTRACT

A method and apparatus for minimizing the total power of a logic network subject to timing constraints. The method describes a procedure to assign power and/or delay to each circuit in a logic network such that the total power is minimized and the arrival time requirement at the outputs of the logic network is met. A subset of circuits in the logic network are powered up and powered down in repeated succession in order to minimize the total power of the logic network.

21 Claims, 12 Drawing Sheets

PROCEDURE TO MINIMIZE TOTAL POWER OF A LOGIC NETWORK SUBJECT TO TIMING CONSTRAINTS

DESCRIPTION

1. Technical Field

The present invention relates to the design and manufacture of integrated circuits, and more particularly to a method and apparatus for power minimization in a logic network.

2. Background Art

Power consumption and signal delay are crucial to the design of high-performance very-large scale integrated (VLSI) circuits. In this patent application, the terms "VLSI circuits," "VLSI chips, " "logic networks," and "integrated circuits" are used interchangeably. The size and complexity of integrated circuits are increasing every day, and it is becoming increasingly important to minimize power consumption while simultaneously meeting timing constraints. VLSI chips may contain hundreds of thousands of transistors. The timing delay and power consumption associated with the VLSI chip is directly proportional to the complexity of the VLSI chip.

Each VLSI chip is made up of one or more interconnected circuit elements. These interconnected circuit elements form various logic combinations that perform specified logic functions. Each logic combinations may be identified as a logic block of some predetermined definition. Each circuit element within the logic block has both a power and delay values assigned to it. Logic blocks are provided by the manufacturer with the capability of being able to select an appropriate power level to achieve a predetermined system timing parameter.

In general, every circuit and/or network has distinctive conditions that can not be exceeded relative to power and delay. For example, the power can be continually increased until the intrinsic delay of the circuits is reached or the total power limit for the network is exceeded. If the timing requirement is violated, circuit/-timing delay can be reduced by powering up the VLSI circuits until the required arrival time (RAT) is met or until the above conditions are reached, at which time the RAT cannot be met by increasing the power. Consequently, the timing requirement may be achieved in general at the expense of power. However, it is neither necessary nor desirable to set the power level of the individual circuits to their highest power level. Therefore, the problem is one of minimizing the total power for a given combination of logic blocks consistent with the overall timing constraints of the logic network.

Analytical power/timing techniques have been described for optimizing logic circuit designs, such as described in a paper entitled "Analytical Power/Timing Optimization Technique for Digital System", presented at the Fourteenth Design Automation Conference on Jun. 20-22, 1977, by A. E. Ruehli, P. K. Wolff, Sr., and G. Goertzel of the IBM Thomas J. Watson Research Center. This paper describes a method for logic gate delay assignment which achieves power minimization of digital logic while satisfying system timing. However, the method requires simplistic assumptions of the power/delay model in order to perform the analysis. These simplifications seriously reduces the accuracy of both the power minimization and the satisfaction of the delay constraints and the convergence stability of the underlying algorithm, making the approach inappropriate for large scale, high performance circuit design.

Other prior approaches primarily handled the problem of power minimization on a logic block to logic block basis. Very few prior approaches, if any, have handled the problem on a global basis.

Thus, there is a need to minimize the power level in VLSI circuits, while still maintaining the overall system timing requirements. The present invention achieves this result through application of the method and apparatus described herein.

DISCLOSURE OF INVENTION

The present invention provides a new and improved method and apparatus for minimizing the total power of a logic network subject to timing constraints. The method of the present invention is applicable for use in connection with logic blocks wherein the combination of logic blocks make up a logic network. The logic blocks consist of either a circuit element (for example, transistor or a logic gate) or a set of circuit elements. Signals are propagated from sources of the network to sinks of the network, and the signals should arrive at their respective sinks within a specified required arrival time (RAT). The problem of power minimization with timing constraints is to assign power to each logic block in the network, such that the RAT requirement is met and the total power consumed by the network is minimized.

The present invention operates by: (1) determining if the required arrival time can be met; (2) assigning delay to each delay-segment so that the arrival time requirement at the sinks is met and every edge-segment is at the largest possible delay; (3) powering down the network such that the overall network delay is increased by DELTA and the total first order power decrease is maximized; (4) powering up the network such that the overall network delay is decreased by DELTA and the total first order power increase is minimized; (5) checking to see if the total power remains the same, and if so reducing DELTA accordingly; and repeating the above steps (3)–(5) until DELTA equals zero.

The foregoing and other objects, features and advantages of the invention will be apparent from the following more particular description of the preferred embodiments of the invention, as illustrated in the accompanying drawings.

BRIEF DESCRIPTION OF DRAWINGS

The present invention will be described with reference to the accompanying drawings, wherein.

BEST MODE FOR CARRYING OUT THE INVENTION

I. Environment of the Present Invention

Figure 1:
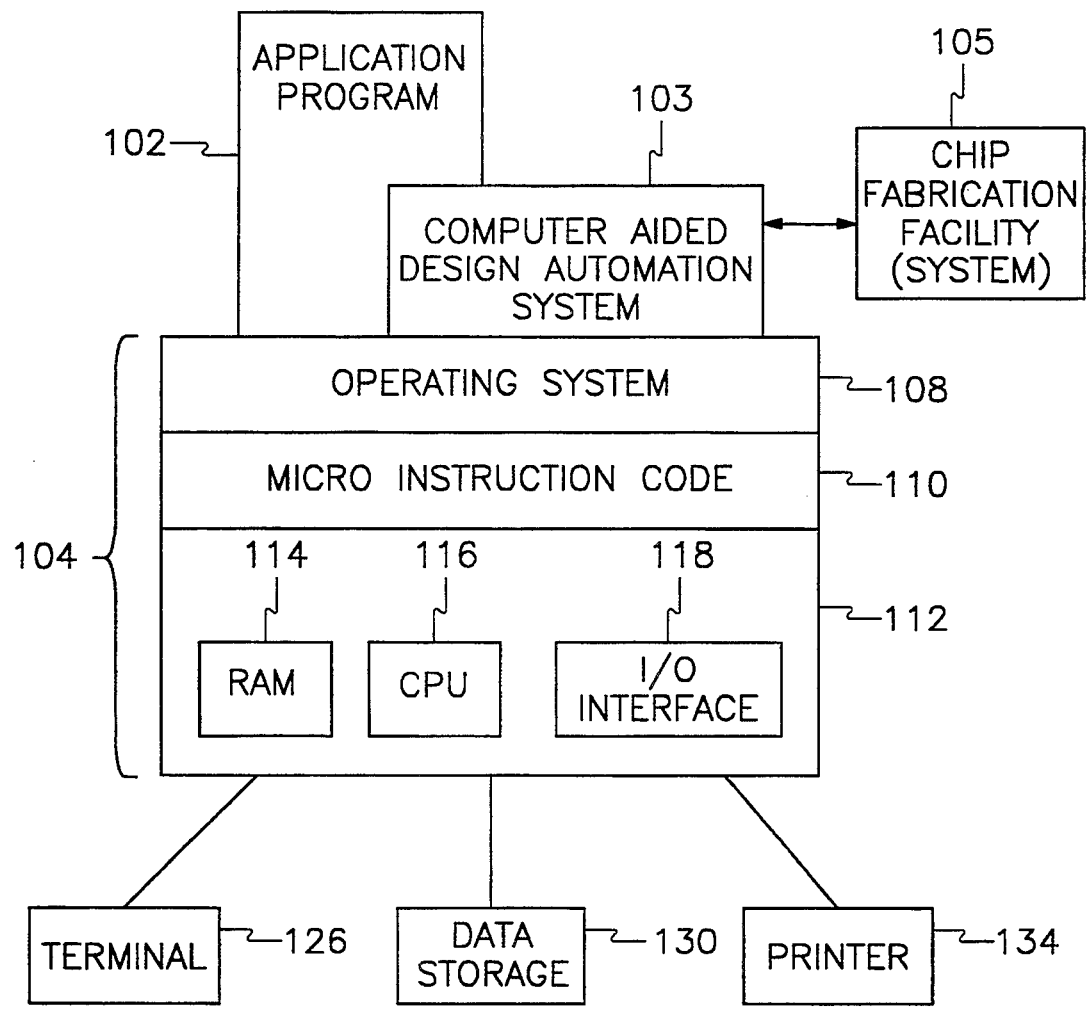
FIG. 1 shows an environment for the present invention.

FIG. 1 illustrates an environment in which a preferred embodiment of the present invention operates. The preferred embodiment of the present invention includes an application program 102. The application program 102 represents power minimization software of the present invention.

The preferred embodiment of the present invention operates on a computer platform 104. The computer platform 104 includes certain hardware units 112 including one or more central processing unit (CPU) 116, a random access memory (RAM) 114, and an input/output interface 118. The computer platform 104 includes an operating system 108, and may include microinstruction code 110. A computer aided design automation system 103 and chip fabrication system 105. Various peripheral components may be connected to the computer platform 104, such as a terminal 126, a data storage device 130, and a printing device 134.

In a preferred embodiment of the present invention, the computer platform 104 is any International Business Machines (IBM) 3090 mainframe RS6000 workstation or the PS/2 personal system based on the Intel 80386 or 80486 microprocessor. The operating system is the IBM AIX operating system. The application program 102 is written in C programming language.

II. Description of the Underlying Technology and Theory Utilized by the Present Invention Generally, a logic network includes a set of logic blocks. The logic blocks are made up of one or more circuit elements. Each logic block has a set of inputs and outputs. Typical logic blocks are transistors, AND-gates, OR-gates, inverters, multiplexers, registers, drivers, data-path and/or random logic macros. The logic blocks are interconnected from output to inputs to form the logic network.

The present invention is described with reference to FIG. 2a, which illustrates a representative logic network 200 having logic blocks labeled A 202a, B 202b,. . ., G 202g. Ai1 204a, Bi1 204b, Ci1 204c, Ci2 205c,...,Gi1 204g, Gi2 205g are inputs and Ao1 206a, Bo1 206b,..., Go1 206g are outputs of the logic blocks 202.

A delay-segment is an element whose power and delay can be adjusted. It can be either a circuit element or a set of circuit elements. External to the logic blocks 202, signals propagate from the outputs 206 to inputs 204 and 205 through external delay-segments, for example (Ao1 206a, Bi1 204b) and (Ao1 206a, Ci1 204c). In each logic block 202, signals also propagate internally through internal delay-segments. An internal delay-segment 216 (for example) in a logic block 202d goes from an input 205d to an output 206d that has logical dependency on the input 205d.

The internal and external delay-segments form a directed, acylic graph or delay graph. FIG. 2b shows an example of the delay graph 275 for the network shown in FIG. 2a. It should be pointed out that, without loss of generality, the delay graph is simplified (FIG. 2b) by excluding the delay-segments related to the REGISTER element 220. For purposes of explaining the directed graph 275 it is helpful to define source and sink nodes. The nodes 280 of the graph are inputs 204 and 205 or outputs 206 of the logic blocks 202, and the edges 290 through 299 are delay-segments (external or internal). The source nodes start from the primary inputs (for example the inputs 204a and 205c) of the logic network and register outputs, and the sink nodes end at the primary outputs of the logic network and register inputs (for example the outputs 206f and 206g). The directed graph 275 is also called a delay graph 275 of the logic network 200.

At each node 280 of the delay graph 275, an arrival time is assigned or allocated by a chip designer. The arrival time measures the time required for signals to travel from the left-most outputs to the right most inputs. Each edge 290 of the delay graph 275 is assigned a delay, which is the time to propagate a signal through the corresponding delay-segment.

For external connections of the logic blocks 202, to the first order, the delay of a delay-segment depends on the length, capacitance, and resistance of the connection, and the input capacitance of the successor circuits. To the second order, the delay depends on the power of a driving circuit and affects the transition time of the signals to the successor circuits, and hence the delay of the successor circuits. For internal delay-segment in a logic block 202, to the first order, the delay is governed by the gate delay, device size and power consumption of the underlying circuits of the logic block 202. To the second order, the delay depends on the loading at the output and the signal transition time at the input of the delay-segment, the delay also affects the delay of the output connections. To account for the second order effect, the delay of a delay-segment is computed in conjunction with the delay of the predecessor and successor delay-segments. If the capacitance and resistance of inter-block connections are given, the delay of a logic block depends on both the predecessor and the successor blocks, and thus only the delay-segment internal to the logic block must be considered.

To the first order, the delay-segments are treated independently with each other in terms of delay. The delay and power of a logic block or an internal delay-segment are modelled by a convex, monotonic decreasing function. The delay of the logic network 200 decreases as more power is applied to the underlying circuits/devices of the logic blocks 202, or the area of the underlying circuits/devices of the logic blocks 202 is increased. Power and area of the circuits may be considered proportional to each other. If the circuit devices are scaled in only one direction, then power and length (or width) may be considered proportional to each other. So minimizing power of a network 200 is directly related to area minimization, hence improving density, wiring and performance of the overall system. In addition, there is also a minimum intrinsic delay in each circuit device which is independent of the power.

The following equation may be used to represent the area-power-delay characteristic, where A, A' and B are constants.

$$\text{power} = A/(\text{delay} - B) \tag{1}$$

$$\text{area} = A'/(\text{delay} - B) \tag{2}$$

These equations are a useful representation of the power-delay relationship. Any convex function of power and delay, discrete tables of power and delay with interpolation and other similar forms can also be used to determine the power-delay relationship. Based on the trade-off of power-delay, a procedure according to the present invention to minimize the total power of a logic network subject to timing constraints is described below.

Generally, a delay graph 275 may be represented by the relationship $G_D = (V_D, E_D)$, where $V_D$ is the set of nodes and $E_D$ is the set of edges. For each directed edge in the delay graph 275, the arrival time (at) at a successor node (nsucc) should be at least the sum of the arrival time at a predecessor node (npred) plus the delay of the delay-segment represented by the edge=(npred, nsucc). Equation 3 represents this relationship:

$$at\ (nsucc) \leqq at\ (npred) + \text{delay}\ (npred,\ nsucc),$$
$$(npred,\ nsucc) \epsilon\ E_D \qquad (3)$$

The boundary condition for the delay graph 275 is set up as follows: For each source (register outputs, for example 212, or logic network inputs, for example 204a and 205c), the arrival time is equal to a source arrival time (SAT) of the network 200. The required arrival time (RAT) is a constraint on the logic network 200. Each logic block 202 in the logic network 200 is allocated a specific delay in order to satisfy the constraint (RAT).

$$at(n) = SAT(n),\ n \epsilon \text{SOURCE}(G_D) \qquad (4)$$

For each sink (register inputs, for example 208, or logic network outputs, for example 206f and 206g) the arrival time should be at most equal to the required arrival time (RAT) of the logic network 200.

$$at(n) \leqq RAT(n),\ n \epsilon \text{SINK}(G_D) \qquad (5)$$

The above $|E_D| + |\text{SOURCE}| + |\text{SINK}|$ equations specify the timing requirements of the logic network 200.

The power optimization objective is given by Equation 6:

$$\min \Sigma_e \text{power}(e) = \Sigma_e \text{power}(\text{delay}(e)), e \epsilon E_D \qquad (6)$$

This is an optimization problem with a non-linear objective function and linear constraints.

III. Description of the Method of the Present Invention

Figure 3A:
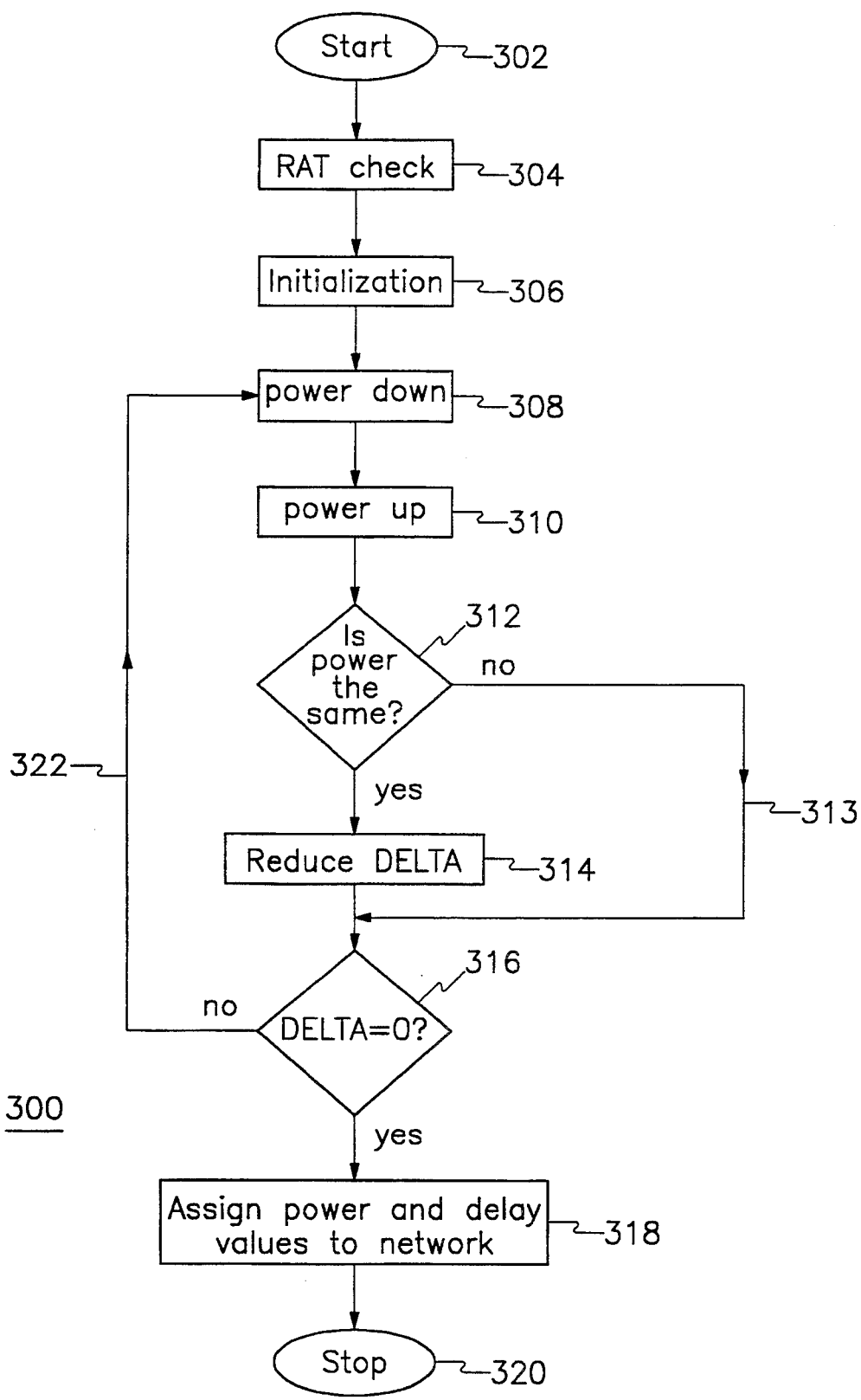
FIG. 3a shows a flow chart of a power minimization method of the present invention.

FIG. 3a shows an overall logic flowchart 300 which describes, in general terms, the operation of a power minimization procedure of the present invention. This procedure 300 is embodied in the application program 102 and the computer aided design automation system 103. In general, the procedure 300 shown in FIG. 3a accepts data representing the current delay of the logic network 200 and the current power level of the logic network 200. The delay and power can be considered to be independent and dependent resources, respectively. The circuit elements in the logic network 200 consumes the independent resources and the dependent resource in an amount which is a nonlinear function of the amount of the independent resource consumed by the circuit elements. The procedure 300 then generates more efficient power delay operating points for the logic blocks in the logic network 200 in which the overall power of the network 200 is minimized, while still satisfying the established timing constraints.

In FIG. 3a, the procedure 300 begins with a start command 302, followed by two separate and distinct initialization steps 304 and 306. The first step 304 is the required arrival time (RAT) check.

Figure 3B:
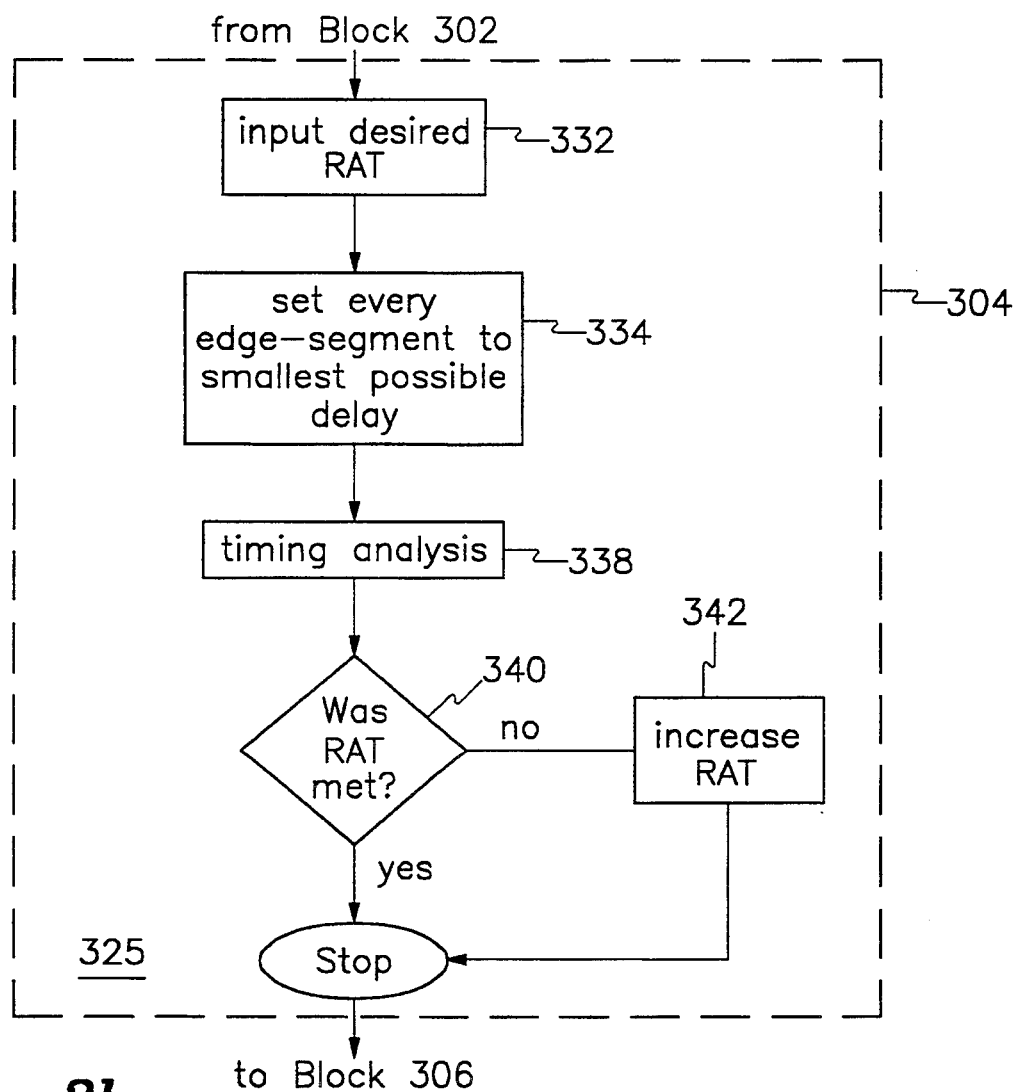
FIG. 3b shows a flow chart of a RAT check.

FIG. 3b is a detailed flowchart 325 representing the operation of block 304 of FIG. 3a. The flowchart 325 outlines the operation of the RAT check 304. The RAT check 304 establishes whether the designer specified RAT can be satisfied.

In step 332, the designer of the network provides an ideal and/or preferred RAT or constraint for the logic network 200 as a whole, as well as for the individual sinks.

In step 334, every edge-segment is set to the smallest possible delay.

In step 338, a timing analysis is performed to determine whether this ideal or preferred RAT can be met.

In step 340, if the given RAT cannot be met, then in step 342 the RAT has to be modified in order to satisfy the timing requirement. The RAT check 325 is applied to the entire circuit as a whole, and only after it is determined in step 340 that the given RAT cannot be met is there, in step 342, a change to individual sinks in the logic network 200. Specifically, in step 342, the RAT is increased for the sinks that fail to meet their given unique RAT. The RAT is increased, for example, by an amount that is equal to the difference between the actual arrival time after administering the above check and the required arrival time. Any standard timing analysis procedure known to one skilled in the art of integrated chip design could be used with the present invention.

Figure 3C:
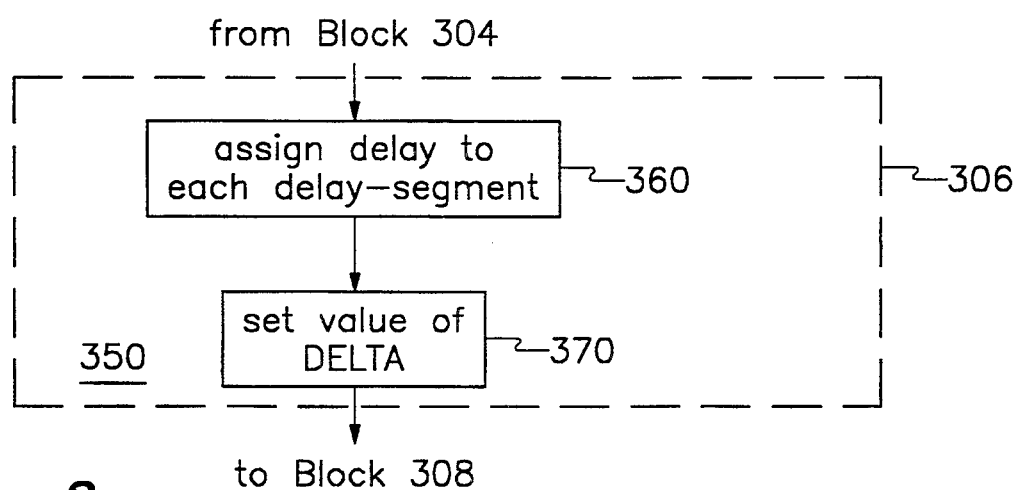
FIG. 3c shows a flow chart of initialization.

FIG. 3c is a detailed flowchart 350 representing the second initialization step shown in block 306. Step 360 entails allocating the independent resource among the resource consuming elements of the logic network 200, or in other words, assigning a delay to each delay-segment. Each delay-segment is assigned, for example, a delay so that the arrival time requirement at the sinks is met, for example $at(n) \leqq RAT(n)$, $n \epsilon \text{SINK}$ and $\Sigma_e$ delay(e) is maximized. Initially, however, this amounts to setting every edge-segment to the largest possible delay possible, while still satisfying the RAT. If the delay for the delay-segments is unknown in step 360, then: $at(nsucc) \geqq at(npred) + \text{delay}(e)$, $e = (npred, nsucc) \epsilon E_D$; $at(n) = SAT(n)$, $n \epsilon \text{SOURCE}(G_D)$; $at(n) \leqq RAT(n)$, $n \epsilon \text{SINK}(G_D)$; and max $\Sigma_e$ delay(e). If, however, the initial delay is given for each delay-segment, then change delay of some of the edges to just satisfy the RAT. Thus: $at(nsucc) \geqq at(npred) + \text{delay}(e) + \Delta\text{delay}(e)$, $e = (npred, nsucc) \epsilon E_D$; $at(n) = SAT(n)$, $\Delta n \epsilon \text{SOURCE}(G_D)$; $at(n) \leqq RAT(n)$, $n \epsilon \text{SINK}(G_D)$; and max $\Sigma_e \Delta \text{delay}(e)$.

In step 370, the value of DELTA is set. DELTA can be set at any value, but for illustration DELTA might be set at: $\text{DELTA} = \frac{1}{2} \max_{i \epsilon \text{SOURCE},\ j \epsilon \text{SINK}} (RAT(j) - SAT(i))$.

From block 306, the procedure 300 proceeds to a further block 308, in which a procedure 450 of powering down the overall network is performed. The powering down procedure 308 is such that the overall network delay is increased by DELTA and the total first order power decrease $\Sigma_e (dP/dD)_{D=d0(e)} \Delta\text{delay}(e)$, $e \epsilon E_D$ is maximized. $(dP/dD)_{D=d0}(e)$ is the derivative at $D = dO$ for delay-segment e on its power-delay characteristic, and $\Delta\text{delay}(e)$ is the delay increase from $D = d0$ for e. The power down procedure 450 is detailed below in conjunction with FIG. 4b. Procedure 308 can also viewed as perturbing the constraint (RAT) by an specified amount, for example DELTA. Thus, perturbing the amount of the independent resource in at least one of the resource consuming elements, such that the dependent resource is changed (improved) by a value $P_{down} = \Sigma_{e \epsilon E_p} P_e(d(e)) - P_e(d_o(e))] \leqq 0$ where $E_p$ is a set of perturbed resource consuming elements with delay increased, and $d(e) \geq d_o(e)$.

The procedure 300 flows from block 308 to block 310, in which a procedure 400 for powering up the network is performed. The objective of the power up procedure 310 is the exact antithesis of the power down procedure 308. Accordingly, the overall network delay is decreased by DELTA, while the total first order power increase $\Sigma_e(dP/dD)_{D=do(e)}\Delta delay(e)$, $e \in E_D$ is minimized. $(dP/dD)_{D=do(e)}$ is the derivative at D equal to dO for delay-segment e on its power-delay characteristic, and $\Delta delay(e)$ is the delay decrease from D equal to dO for e. The power up procedure 310 is detailed below in conjunction with FIG. 4a. Procedure 310 can also viewed as perturbing the constraint (RAT) by a specific amount. Similar to the power down procedure this amount could be, for example, equal to DELTA. Thus, perturbing the amount of the independent resource in at least one of the resource consuming elements, such that the dependent resource is changed (worsened) by a value $P_{up} = \Sigma_e{}_{\in E_p}[P_e(d(e))-P_e(d_o(e))-] \geq 0$ when $E_p$ is a set of perturbed resource consuming elements with delay decreased and $d(e) \leq d_o(e)$.

Part of the power down 308 and power up 310 procedures described above is defining an object variable equal to the dependent resource consumed by the logic network 200. In other words, the total power of the logic network, before the power down 308 and power up 310 procedure is administered, is saved. The power down procedure's 308 goal is to essentially improve the value of the object variable by an amount $P_{down}$; while the power up procedure's 310 goal is to worsen the value of the object variable by an amount $P_{up}$ less than $|P_{down}|$.

Thus, as seen in block 312, the total power of the logic network is measured. If the total power remains the same, DELTA is reduced. An example of such a reduction might be to reduce DELTA to DELTA/2. However, if the total power is not the same then the procedure 300 does not reduce DELTA, but traverses 313 to block 316.

The procedure flows to block 316, where it is determined whether DELTA has reached zero. In an alternative embodiment, the procedure determines whether DELTA has reached or is below some lower limit. If DELTA equals 0 then the procedure flows to 318; however, if DELTA does not equal 0 the procedure flows back 322 to block 308, and the procedure continues as described above. It will become apparent from the examples described in Section VII herein, that DELTA will always reach zero, and thus the procedure 300 will always end.

The procedure 300 iteratively traverses blocks 308 and 310, reducing the power while meeting the overall timing requirement.

Finally, the procedure flows to block 318. Once the procedure 300 has determined what the optimum power and delay values are for the logic network, each delay-segment of the network is assigned a power and delay value such that the total power is minimized and overall timing requirement is met. This step is an essential part of the chip manufacturing process. Once step 318 is finished the procedure 300 stops 320.

The order of blocks 308 and 310 is interchangeable. Consequently, the procedure works equally well regardless of which procedure - the power down 308 or power up 310 is executed first. FIG. 3a has the power down 308 sequence first only for illustrative purposes.

IV. The Power-Delay Trade-off

Figure 2A:
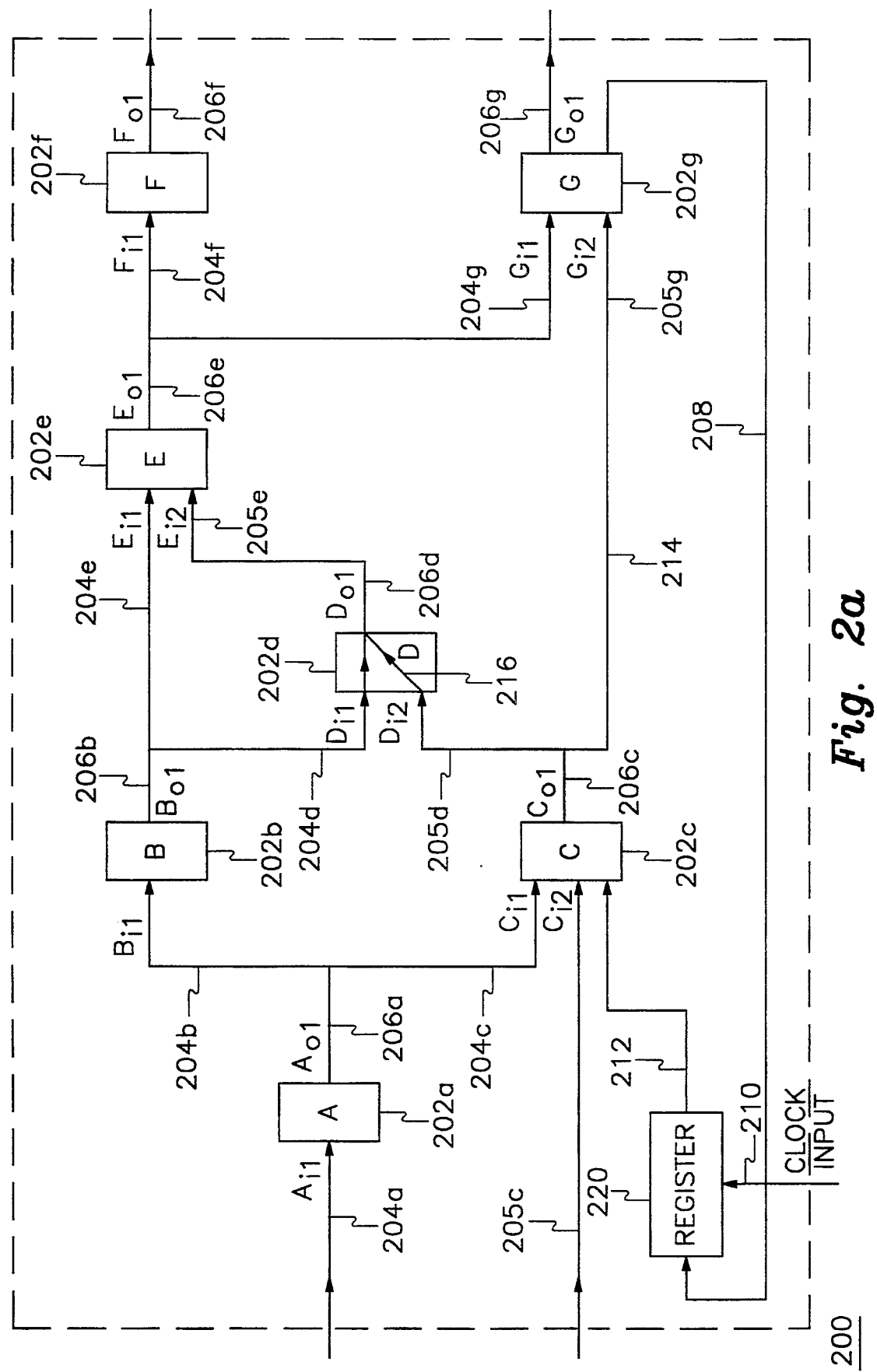
FIG. 2a shows in schematic form a first logic network.
Figure 2B:
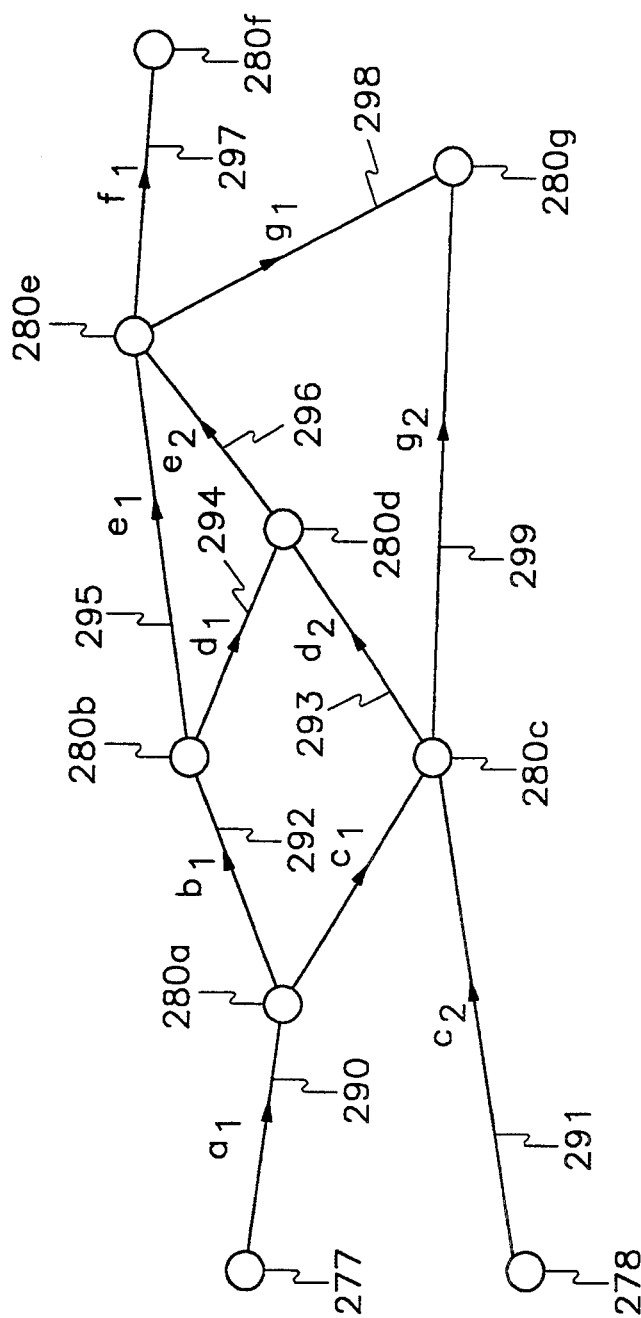
FIG. 2b shows a directed delay-graph.

Given the logic network 200 of circuit connections as shown in FIG. 2a, the arrival time at each sink of the network can be reduced by increasing the power of a subset of circuits. The power up 310 and power down 308 procedure provide, respectively, a method to increase/decrease the power of a subset of circuits in the network 200 in a way to reduce/increase the arrival time at each of the network outputs by a specific amount. By considering the delay-power characteristic of the circuits the arrival time can be reduced in the direction of smallest total power increase. A typical scenario is: given a chip design that exceeds a target cycle time requirement, the procedure 310 can be applied to speed up a subset of the circuits in a way to meet the overall target cycle time.

A. Underlying theory for the Power Up Procedure

Generally, given a chip design where the timing of the network is off at each sink in $SINK(G_D)$ by an amount denoted by $DELTA(n)$, $n \in SINK(G_D)$, the designer/manufacturer may select a subset of the logic blocks or delay-segments and power them up to reduce the delay of the blocks, and subsequently reduce the network delay by the amount given by $DELTA(SINK)$, hence meeting the timing requirement.

Let $\Delta at$ be the decrease in arrival time, $\Delta delay$ be the decrease in delay in the delay-segments; the set of timing specifications that is required to reduce the network delay by at least $DELTA(SINK)$ is given by:

$$\Delta at(nsucc) \leq \Delta at(npred) + \Delta delay(npred, nsucc), \quad (npred, nsucc) \in E_D \tag{7}$$

$$\Delta at(n) = 0, \quad n \in SOURCE(G_D) \tag{8}$$

$$\Delta at(n) \geq DELTA(n), \quad n \in SINK(G_D) \tag{9}$$

It should be pointed out that $\Delta delay$ equals zero for external connections in this formulation.

Figure 5:
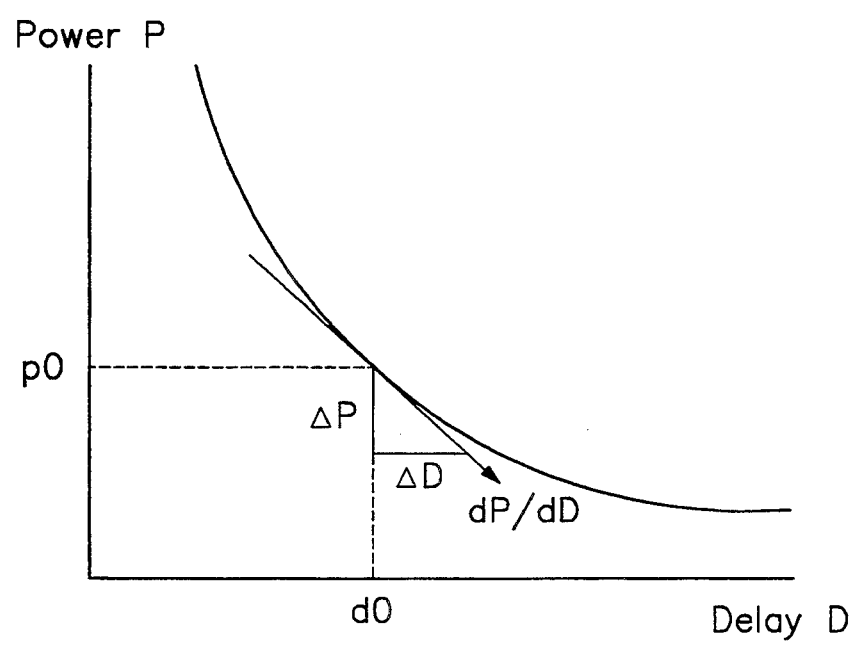
FIG. 5 shows a Power-Delay characteristic graph.

The subset of the delay-segments selected for powering up (or reducing delay) is the set that minimizes the total first order power increase. As shown in FIG. 5, the first order power increase $\Delta P$ of a delay-segment is the derivative $dP/dD$ at the delay operating point D equal to dO in the power-delay characteristic times the decrease in delay $\Delta D$, as shown in Equation 10.

$$\Delta P = (dP/dD)_{D=dO}\Delta D \tag{10}$$

The objective of powering up the network to meet the timing requirement is:

$$\min \Sigma (dP/dD)_{D=do(e)}\Delta delay(e), \; e \in E_D \tag{11}$$

The solution of Equation 11 gives the increase in power (or decrease in delay) for each delay-segment. The optimization problem can be solved using standard linear programming techniques, such as the simplex algorithm or the interior point techniques or heuristic to take advantage of the special matrix and network structure of this problem.

The present invention, however, contemplates the use of any form of presently known or future developed optimization technique used in combination with the disclosed invention.

B. The Power Up Procedure

Figure 4A:
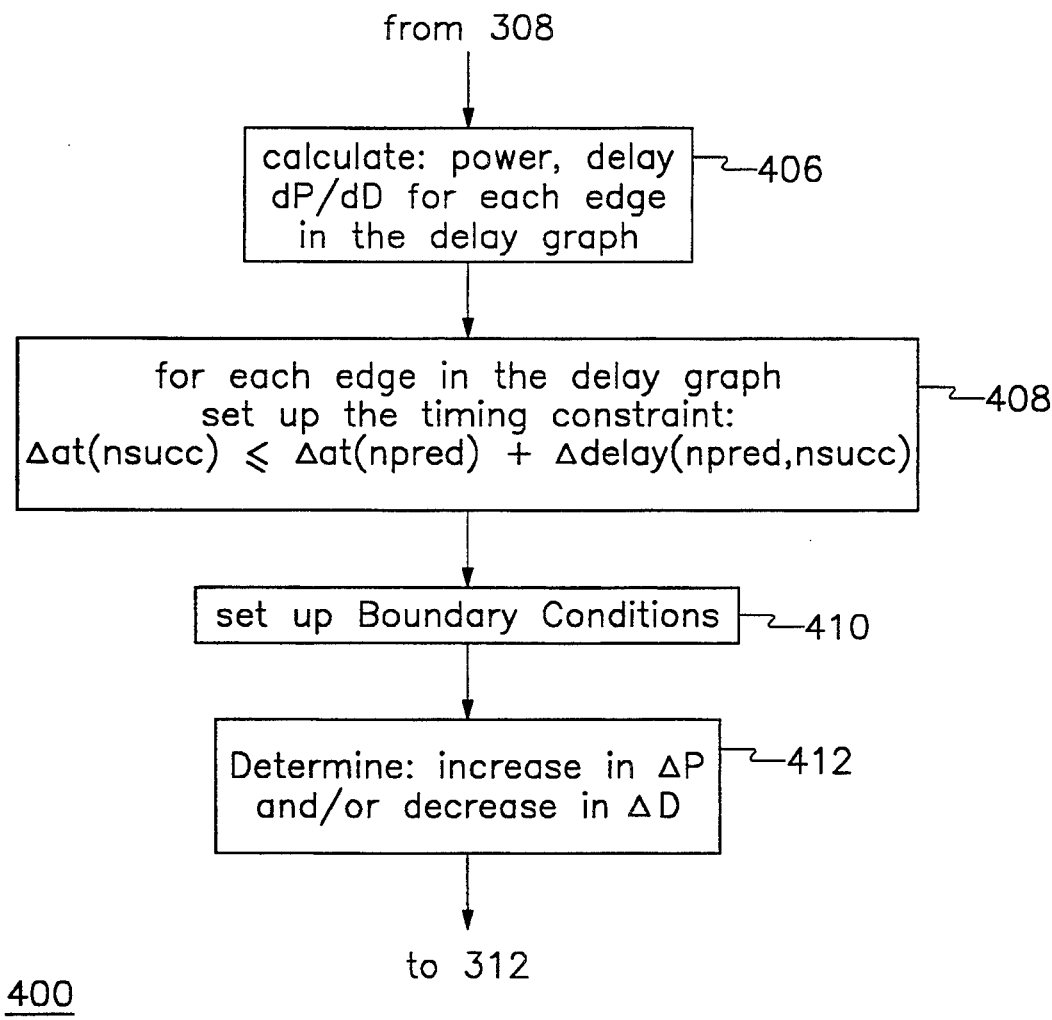
FIG. 4a shows a flow chart of a power down method of the present invention.

FIG. 4a is a detailed flowchart 400 illustrating the operation of block 310 of FIG. 3a which outlines the operation of the procedure for powering up the network. In FIG. 4a, data arrives at block 406, in which the power, delay, and dP/dD are all calculated. These values are all calculated at the delay operating point D equal to d0 for each edge in the delay graph $G_D$.

Next, the procedure flows to block 408, in which a timing constraint is set up for each edge in $G_D$. The timing constraint is represented by Equation (7). Block 410 sets up the boundary conditions, Equations (8) and (9) above, for the arrival time for each SOURCE node and the required arrival time for each SINK node. Finally, Block 412 determines what the increase in power $\Delta P$ and/or decrease in $\Delta D$ for each delay-segment in order to reduce the network delay by DELTA(SINK) such that the total first order power increase in minimized.

Figure 7A:
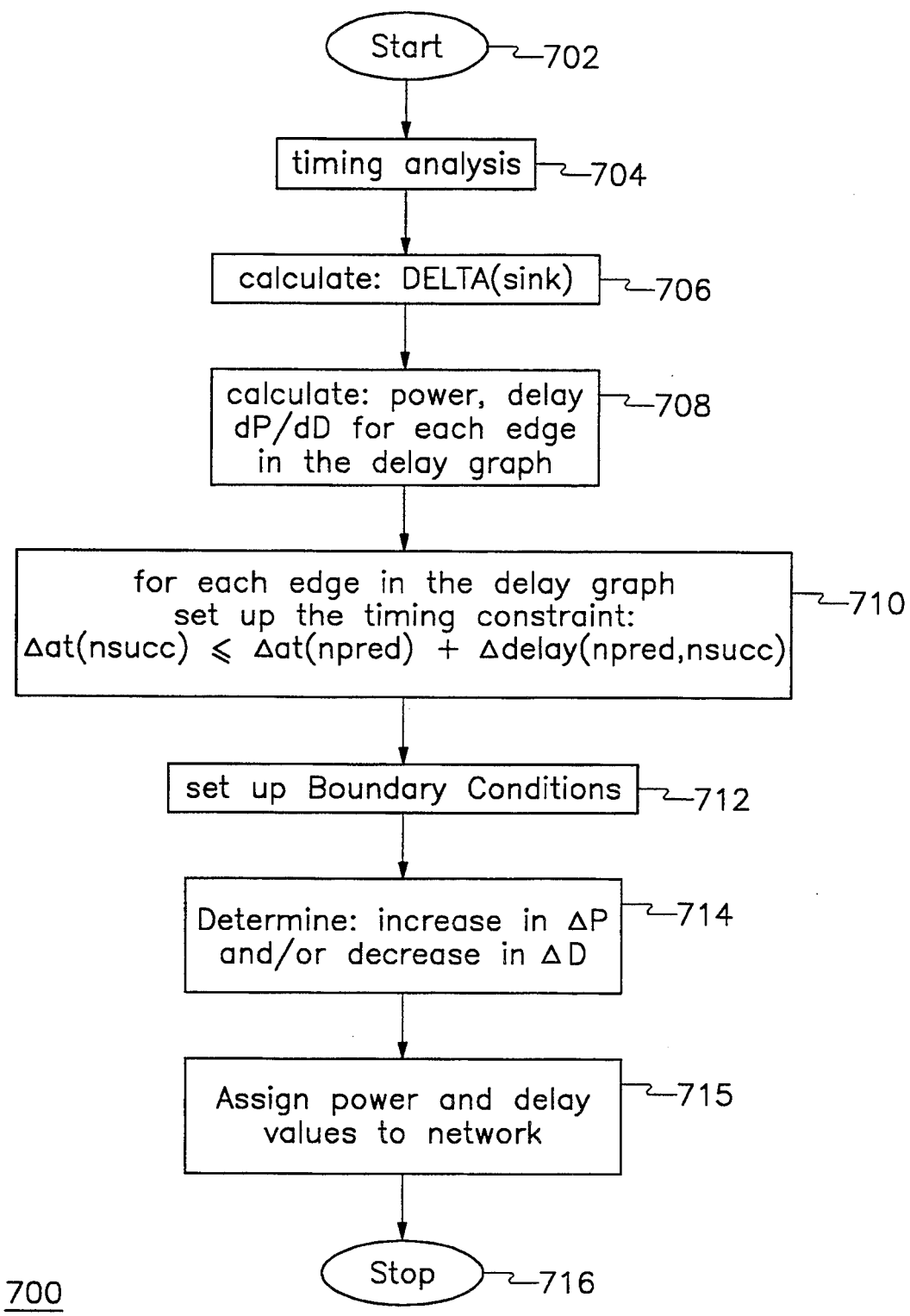
FIG. 7a shows a flow chart of a power up method.

The above description of the power up sequence is an illustration of how the procedure 400 would be implemented if done in accord with the minimization of power procedure 300. However, it is possible to use the power up procedure independently of the minimization of power procedure 300. The power up procedure is shown is FIG. 7a. The procedure 700 is exactly the same as procedure 400, however Blocks 702 704, 706, 715 and 716 are added.

The procedure begins with a start command 702. Block 704 represents the step of performing a timing analysis on the network. The logic proceeds from block 704 to block 706, in which the amount of arrival time being exceeded at each individual sink is calculated. This value is represented by DELTA(SINK). From this point on, the procedure 700 is exactly the same as that described in connection with FIG. 4a. At block 715, the new values of power and delay are assigned to each edge-segment of the network.

C. Underlying Theory for the Power Down procedure

In the case of slowing down the network by DELTA(SINK) in order to lower the power, the above procedure 400 is applied with a slight modification. Let $\Delta at$ be the increase in arrival time, $\Delta delay$ be the increase in delay in the delay-segments; the set of timing specifications that is required to slow down the network delay by at most DELTA(SINK) is given by:

$$\Delta at(nsucc) \geq \Delta at(npred) + \Delta delay \ (npred, nsucc); \quad (12)$$

$$\Delta at(n) = 0, \quad n \in \text{SOURCE}(G_D) \quad (13)$$

$$\Delta at(n) \leq \text{DELTA}(n), \quad n \in \text{SINK}(G_D) \quad (14)$$

The subset of the delay-segments selected for powering down (or increasing delay) is the set that maximizes the total first order power decrease. The first order power decrease $\Delta P$ of a delay-segment, as shown in FIG. 5, is the derivative dP/dD at the delay operating point $D = d0$ in the power-delay characteristic times the increase in delay $\Delta D$, as shown in Equation 15.

$$\Delta P = (dP/dD)_{D=d0} \Delta D \quad (15)$$

The objective of powering down the network to meet the timing requirement is:

$$\max \Sigma_e (dP/dD)_{D=d0}(e) \ \Delta delay(e), \ e \in E_D \quad (16)$$

Hence, for each delay-segment the total first order power is maximized.

As stated above for the power up procedure, the optimization problem can be solved using standard linear programming techniques, such as the simplex algorithm, the interior point techniques, or heuristic. The solution gives the decrease in power (or increase in delay) for each delay-segment.

D. The Power Down Procedure

Figure 4B:
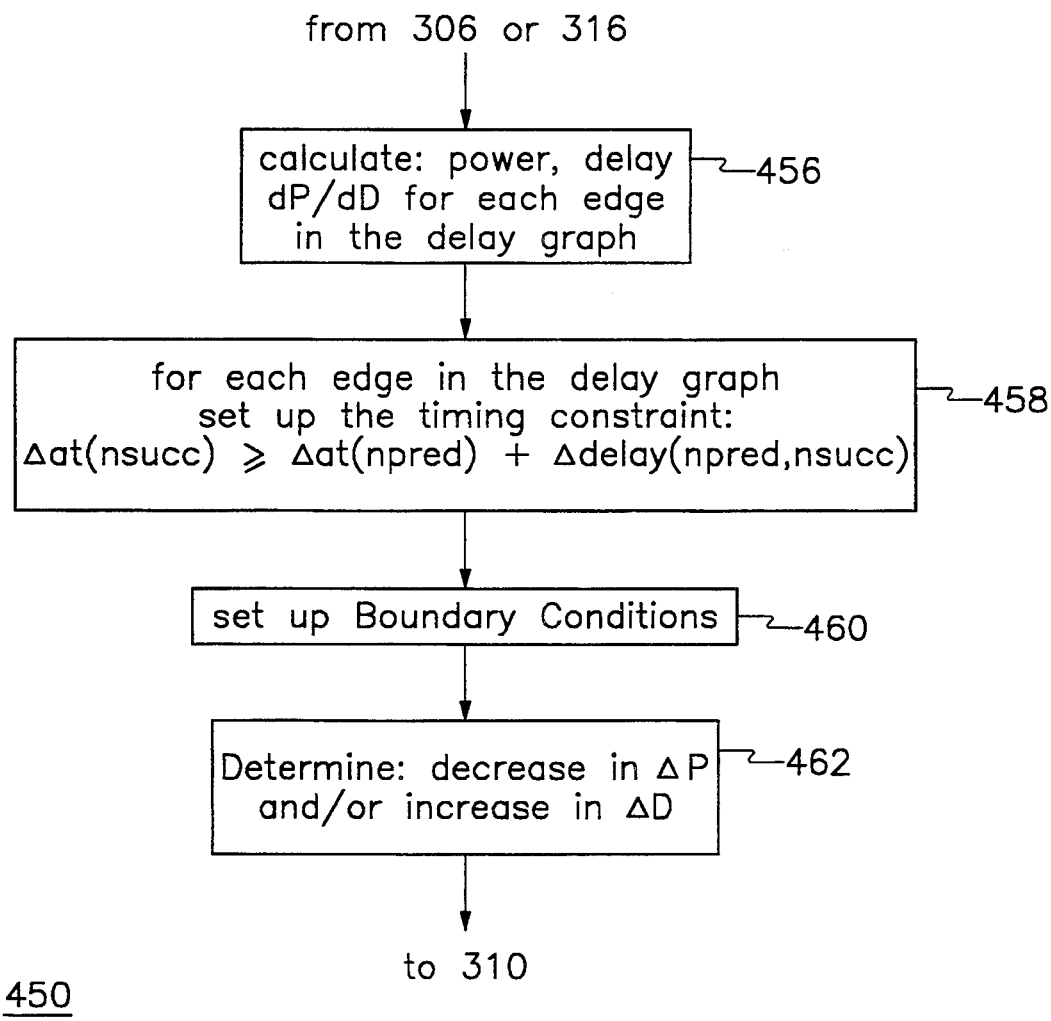
FIG. 4b shows a flow chart of a power up method of the present invention.

FIG. 4b is a detailed flowchart 350 illustrating the operation of block 308 of FIG. 3a, which outlines the operation of the procedure for powering down the network.

The procedure for powering down the network is exactly the same as for powering up the network, described above in FIG. 4a and accompanying text, except for Blocks 458, 460, and 462. Block 458 sets up the timing constraint: $\Delta at(nsucc) \geq \Delta at(npred) + \Delta delay(npred, nsucc)$ for each edge in the delay graph $G_D$. Block 460 sets up the boundary conditions based on equations (13) and (14). Block 462 determines what the decrease in power $\Delta P$ and/or increase in delay $\Delta D$ is for each delay-segment in order to increase the network delay by DELTA(SINK) such that the total first order power decrease in maximized.

Figure 7B:
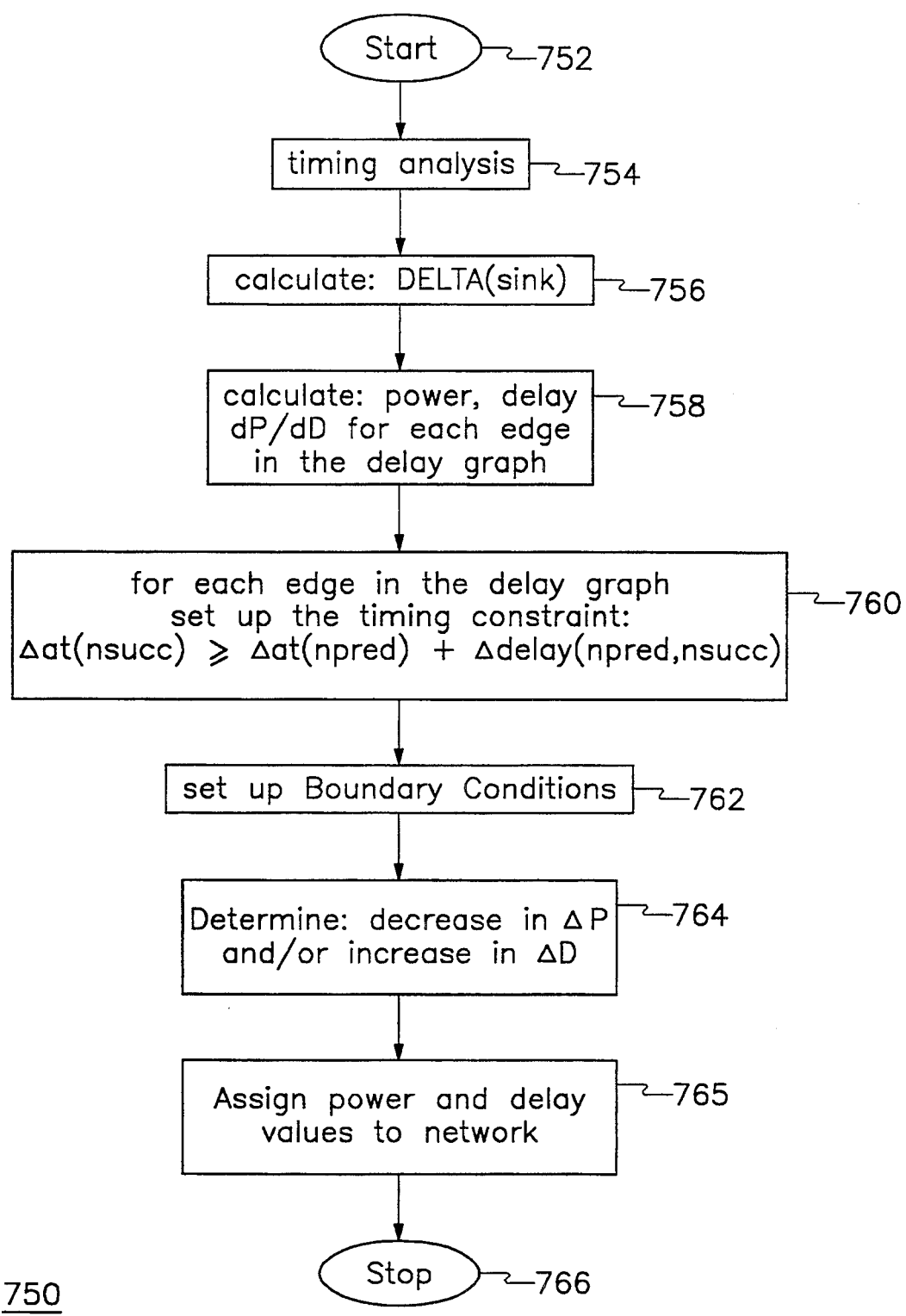
FIG. 7b shows a flow chart of a power down method.

Analogous to the independent power up procedure 700, the power down procedure can be used independently from the minimization of power procedure 300. The independent power down procedure is shown in FIG. 7b. Once again, the only difference between the power down procedure 450 and the independent power down procedure 750 is blocks 752, 754, 756, 765 and 766. These blocks are exactly the same as that described above for the independent power up procedure 700.

V. Power optimization and Cut-Sets

The subsets used in the power up and power down procedures, respectively, are typically different subsets. This characteristic is what allows the above described procedure 300 to ultimately decrease and minimize the power used on the overall logic network. The subsets used in the power up 308 and power down 310 procedures described above are ascertained as set forth below. The present invention contemplates the use of any form of presently known or future developed technique for determining the subsets used in combination with the disclosed invention.

Generally, from the inputs to the outputs of a logic network there are a plurality of different paths. Each path contains a collection of different circuits elements. Among all the different paths, the largest path delay determines the total delay of the logic network. The path delay for each unique path is the sum of the delay in each delay-segment present in that path.

A cut-set is a set of circuits that cuts every path once. The power-optimization procedure uses two types of cut-sets: (1) an L set and (2) an M set. The L and M sets are a more general means of performing the power minimization procedure described above. The L set is the set of circuits or set of delay-segments that are powered up and the M set is the set of circuits that are powered down. The L set cuts each path in the logic network at least once, while the M set cuts each path in the logic network at most once.

For illustration purposes consider the power down procedure 450. Powering down is equivalent to allowing the delay to increase. Since one of the objectives of the present invention is to meet the given RAT, the network can not afford to increase every critical path more than once. Delay will inherently increase when powering down the network. Hence, there is no need to increase delay in every particular circuit more than once. On the other hand, when you power up you do not mind if some paths have to be reduced in terms of delay more than once. $L_c$ is a L-cut set that minimizes $\Sigma_e(\partial P/\partial D)(e)\Delta D_e = \pi_L \geq 0$; $M_c$ is a M-cut set that maximizes $\Sigma_e(\partial P/\partial D)(e)\Delta D_e = \pi_M \geq 0$; and $\Delta P = \pi_L + \pi_M$.

The basic concept is that during the power up and power down procedures described above there is a trade-off of one set of subsets for another, such that the delay remains the same while the total power is minimized.

A linear programming technique is implemented to ascertain the L and M sets. The above procedure works well when the logic network is relatively small. However, when the network becomes larger (for example, approximately 10,000 delay segments), compute times increase. Therefore, heuristic or other developed algorithms are the preferred method of isolating the subsets for larger networks.

VI. Delay-Power Trade-off of an Entire Logic Network

Figure 8:
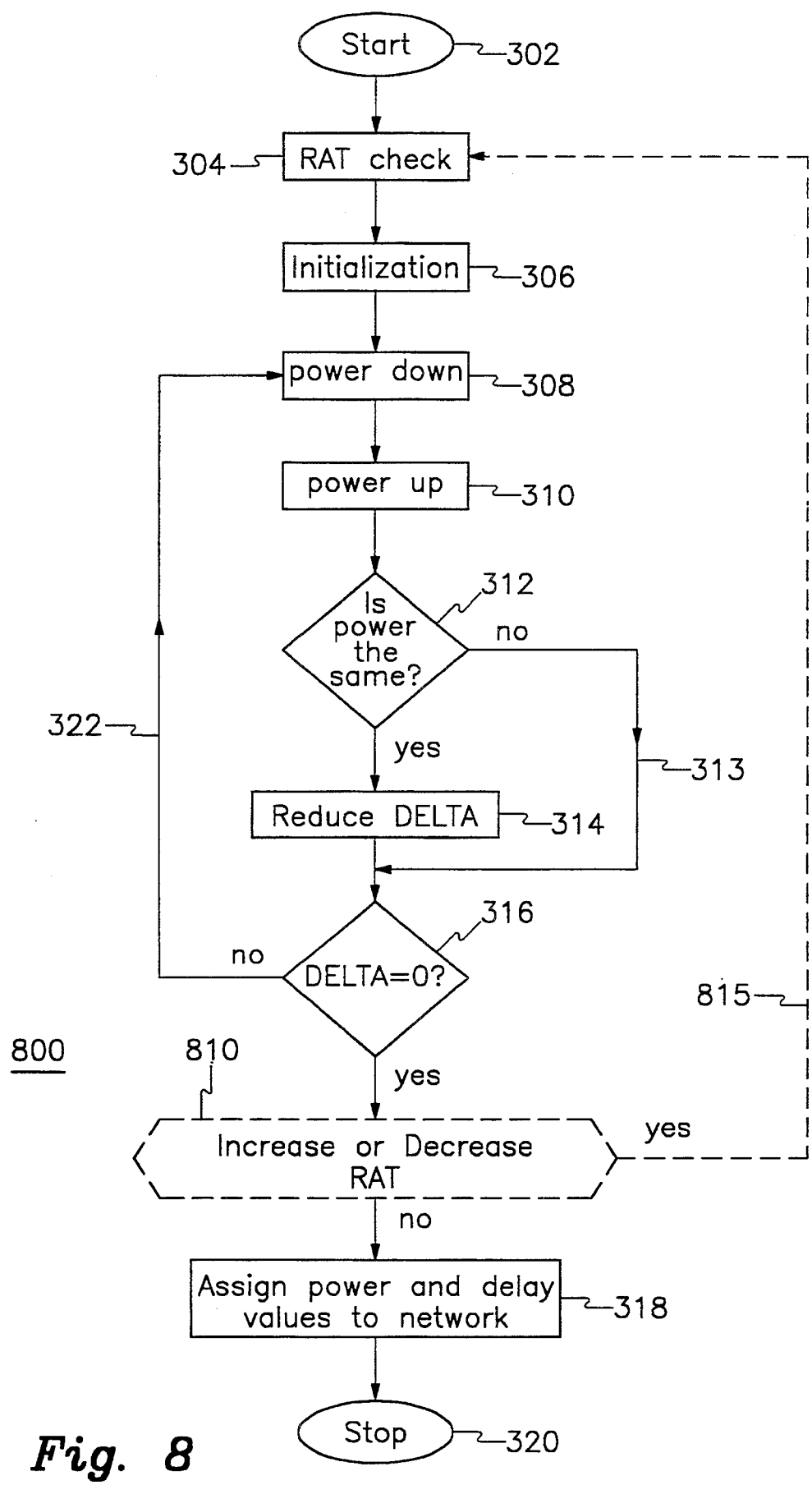
FIG. 8 shows a flow chart of the Delay-Power trade off procedure of the present invention.

Finally, there can be one last step as shown in FIG. 8. At times there might exist a network that can benefit dramatically by an increase/decrease in the RAT at a savings/increase in power. The step 810 includes increasing/decreasing the RAT and repeating the minimization procedure 300 shown in FIG. 3 for this new RAT. This brings the present invention full circle by checking to see if an increase/decrease in delay will produce a significant savings/minimal increase in power for the entire logic network. This has the effect of trading off delay for power, as opposed to the above procedure 300 that basically trades off power for delay.

As a result, one can obtain a faster network (smaller RAT) with the smallest increase in power, or a slower network (larger RAT) with a largest decrease in power.

VII. Two Illustrations of the Present Invention

Figure 6:
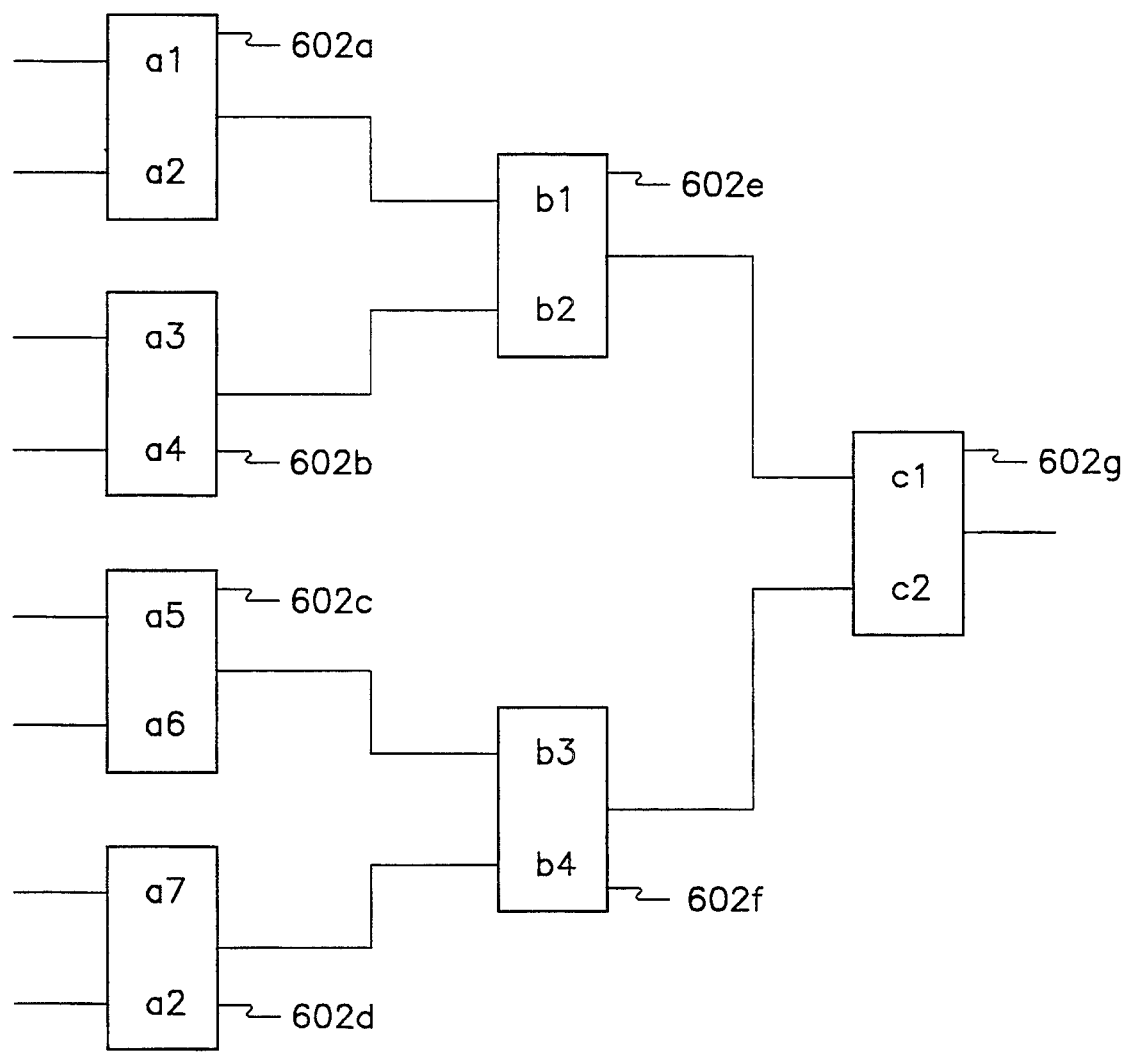
FIG. 6 shows in schematic form a second logic network.

Table 1 shows the results of performing the above described iterations of power up and power down on the logic network shown in FIG. 6. These iterations produce successively smaller power levels. The first column (Delta arrTime) shows that the initial value of DELTA is set at 190. Increasing the delay is analogous to power down and decreasing the delay is analogous to power up. Consequently, a plus (+) sign in front of the DELTA value signifies the power down operation and a minus (−) sign signifies the power up operation.

TABLE 1

| Delta arrTime | a1...a8 | b1...b4 | c1...c2 | total power | RAT |
|---|---|---|---|---|---|
|  | 100 | 100 | 100 | 155704 | 380 |
| +190 | 290 | 100 | 100 | 95384 | 570 |
| −190 | 100 | 100 | 100 | 155704 | 380 |
| +95 | 195 | 100 | 100 | 110056 | 475 |
| −95 | 100 | 100 | 100 | 155704 | 380 |
| +47 | 147 | 100 | 100 | 125028 | 427 |
| −47 | 147 | 100 | 53 | 149496 | 380 |
| +23 | 147 | 100 | 76 | 133288 | 403 |
| −23 | 124 | 100 | 76 | 145064 | 380 |
| +11 | 135 | 100 | 76 | 138896 | 391 |
| −11 | 135 | 100 | 65 | 144956 | 380 |
| +5 | 135 | 95 | 75 | 141974 | 385 |
| −5 | 135 | 95 | 70 | 144538 | 380 |
| +2 | 133 | 95 | 72 | 143424 | 382 |
| −2 | 133 | 97 | 72 | 144498 | 380 |
| +1 | 133 | 97 | 71 | 143952 | 381 |
| −1 | 133 | 96 | 71 | 144484 | 380 |
|  |  |  |  | (−7.77%) |  |

Columns 2,3, and 4 (a,b, and c) shows the delay in each individual logic block 602a through 602g. Column 5 (power) shows the total power in the network. The total power goes up and down depending upon whether the procedure is in the power up or power down mode. The delay in each external inter-logic block connection is 20.

Column 6 (RAT) shows the required arrival time at each iteration step. In this example the overall RAT is set to 380. During the power down mode, the overall network delay is increased by DELTA. A typical starting DELTA is the RAT divided in half. Consequently, as shown in the first power down sequence of TABLE 1, DELTA is set at 190 and the overall network delay is increased to 570 (380+190), and the total first order power decrease is maximized. It should be noted, however, that any value that is less then the given RAT could be used for the starting DELTA. The total first order power drops from 155704 to 95384.

The procedure continues by decreasing the overall network delay by DELTA (190) during the first power up sequence, resulting in the minimization of any increase in the total first order power. This procedure is continued until DELTA is equal to zero, at which time the total power is minimized and the overall timing requirement is met. In this case the total power has been decreased by 7.77% and the RAT of 380 was met.

It should also be noted that the procedure shown in FIG. 3 calls for determining if the power level remains the same 312. In the example shown in TABLE 1, it appears that the power level never remained the same within a given DELTA. However, the iteration where the power remained the same was removed from the table for the sake of brevity (thus, the power up and power down iteration with DELTA equal to ±190 was repeated and the power remained the same).

The example shown in TABLE 1 indicates the results after completing the procedure at one particular starting point (delay=(100, 100, 100)). The decrease in power was 7.77%. The final delay, as shown in TABLE 1, is (133, 96, 71).

The percentage decrease in power that might be realized is dependent upon the starting point. However, the final power level will be relatively consistent regardless of the starting point. It is possible to start with a very poor design which might initially result in the total power being very high. For example, if the starting point was initially set at delay=(278, 11, 11), for each logic block (a,b,c) in FIG. 6., respectively. The total power improvement would be from 6029998 to 144480, a savings of 4073%. However, the final total power remains almost the same or to within a negligible round-off error. The exact optimal solution for the simple network in FIG. 6 can be shown, by mathematical computation, to be (132.3, 96.5, 71.2). For more complex circuits, however, the optimum solution can not be calculate by hand, and thus the need for the present invention.

TABLE 2 demonstrates the use of subsets (cut-sets) through an example of performing both the power up and power down sequence once. The logic blocks represented in TABLE 2 refer to those shown in FIG. 2a and delay graph shown in FIG. 2b.

The upper portion of Table 2 shows the power down sequence with the M-set of delay-segments marked with an X. Only this set of delay-segments is powered down, and thus the delay in each individual delay-segments in the set is increased.

DELTA is set to 10. The table shows the delay D before the power down sequence, as well as the delay D' after the power down sequence. As the table indicates the power was lowered from 366081 to 330282, while the M-set of delay-segments each increased in delay by 10.

The bottom portion of Table 2 shows the power up sequence with the L-set of delay-segments marked with an X. Once again, only this group of delay-segments are powered up. It should be noted, that this set is different from the M-set used in the power down procedure. However, in general, the L-set and M-set may have common elements. Table 2 indicates that the power was increased from 330282 to 348060, while the selected delay-segments each decreased their respective delay by 10.

TABLE 2

| ArrTime: Ai1, Bi2 = 0, RAT: Fo1, Go1 = 300, WireDelay = 20, power = $10^6$/(delay-10) | | | | | | | | | | | |
|---|---|---|---|---|---|---|---|---|---|---|---|
| | a | b | c1 | c2 | d1 | d2 | e1 | e2 | f | g1 | g2 | power |
| Powering Down (DELTA = +10) | | | | | | | | | | | | |
| delay | 40 | 50 | 50 | 110 | 30 | 30 | 80 | 30 | 30 | 30 | 130 | 366081 |
| -dP/dD | 1111 | 625 | 625 | 100 | 2500 | 2500 | 204 | 2500 | 2500 | 2500 | 69 | |
| M-cut | | | | | x | x | x | | | | x | |
| Delay D; | 40 | 50 | 50 | 110 | 40 | 40 | 90 | 30 | 30 | 30 | 140 | 330282 |
| Powering Up (DELTA = −10) | | | | | | | | | | | | |
| delay D | 40 | 50 | 50 | 110 | 40 | 40 | 90 | 30 | 30 | 30 | 140 | 330282 |
| -dP/dD | 1111 | 625 | 625 | 100 | 1111 | 1111 | 156 | 2500 | 2500 | 2500 | 59 | |
| L-cut | | x | x | x | | | | | | | | |
| delay D' | 40 | 40 | 40 | 100 | 40 | 40 | 90 | 30 | 30 | 30 | 140 | 348060 |

This one sequence of power up and power down demonstrates how the total power is reduced (366081 to 348060) while the timing delay of the entire network remains the same as when the above procedure started.

The above sequence would be performed a plurality of times. The iterations would continue until there was no further reduction in power, at which time DELTA would be decreased and the above procedure would start all over again.

TABLE 3

| iteration | delDelay | delPower | total Power |
|---|---|---|---|
| 0 | | | 366081 |
| 1 | 150 | −790950 | 263475 |
| 1 | −150 | 15150 | 366081 |
| 2 | 75 | −395475 | 276539 |
| 2 | −75 | 21975 | 366081 |
| 3 | 37 | −195101 | 294263 |
| 3 | −37 | 27417 | 366081 |
| 4 | 18 | −94914 | 314702 |
| 4 | −18 | 21798 | 366897 |
| 5 | 18 | −127656 | 314702 |
| 5 | −18 | 21798 | 366897 |
| 6 | 9 | −63828 | 329977 |
| 6 | −9 | 12321 | 345907 |
| 7 | 9 | −45540 | 314366 |
| 7 | −9 | 14094 | 332292 |
| 8 | 9 | −24408 | 315035 |
| 8 | −9 | 12276 | 332292 |
| 9 | 4 | −10848 | 323144 |
| 9 | −4 | 7720 | 332292 |
| 10 | 2 | −5424 | 327329 |

TABLE 3-continued

| iteration | delDelay | delPower | total Power |
|---|---|---|---|
| 10 | −2 | 4456 | 332082 |
| 11 | 2 | −5372 | 327032 |
| 11 | −2 | 4524 | 331979 |
| 12 | 2 | −5408 | 327032 |
| 12 | −2 | 4524 | 331979 |
| 13 | 1 | −2704 | 329396 |
| 13 | −1 | 2376 | 331947 |
| 14 | 1 | −2526 | 329396 |
| 14 | −1 | 2376 | 331846 |

TABLE 4

| Power Improvement: (−10.3%) | | | | | | | | | | | | |
|---|---|---|---|---|---|---|---|---|---|---|---|---|
| Delay | a | b | c1 | c2 | d1 | d2 | e1 | e2 | f | g1 | g2 | power |
| initial | 40 | 50 | 50 | 110 | 30 | 30 | 80 | 30 | 30 | 30 | 130 | 366081 |
| optimized | 31 | 39 | 40 | 91 | 40 | 39 | 91 | 31 | 39 | 39 | 149 | 331846 |
| Power Improvement: Random starting point (−1721%) | | | | | | | | | | | | |
| Delay | a | b | c1 | c2 | d1 | d2 | e1 | e2 | f | g1 | g2 | power |
| initial | 11 | 11 | 136 | 167 | 136 | 11 | 167 | 11 | 11 | 11 | 73 | 6044613 |
| optimized | 31 | 39 | 40 | 91 | 40 | 39 | 91 | 31 | 39 | 39 | 149 | 331846 |
| Power Improvement: Another starting point (−131%) | | | | | | | | | | | | |
| Delay | a | b | c1 | c2 | d1 | d2 | e1 | e2 | f | g1 | g2 | power |
| initial | 50 | 50 | 50 | 120 | 15 | 15 | 50 | 15 | 50 | 50 | 120 | 768310 |
| optimized | 31 | 39 | 40 | 91 | 40 | 39 | 91 | 31 | 39 | 39 | 149 | 331846 |

Table 3 shows another illustration of a complete run through the power minimization procedure 300 of the present invention on the logic network shown in FIG. 2a and delay graph in FIG. 2b . Column 1 indicates which iteration is being performed. Column 2 indicates the DELTA being used during that particular iteration. Column 3 shows that difference in power that particular iteration produced. Finally, Column 4 indicates the total power .for the logic network 200. As shown, the iterations 1 through 14 produce successively smaller power levels. As discussed earlier, sometimes the same DELTA is used more then once. For example, iterations 6, 7 and 8 all use DELTA equal to 9. Increasing the delay is analogous to powering down and decreasing the delay is analogous to powering up. The total decreasing power of the logic network can be seen in the last column.

TABLE 4 shows the results of the procedure with three separate and distinct starting points. Consequently, there are three different values for the power improvement in terms of percentage depending on which starting point was used (for example, for a randomly selected starting point, the improvement obtained is 1721%). However, the procedure 300 resulted in the final power of the logic network being the same regardless of the starting point.

While the invention has been particularly shown and described with reference to the preferred embodiments thereof, it will be understood by those skilled in the art that various changes in form and details may be made therein without departing from the spirit and scope of the invention.

We claim:

1. A computer-based method for minimizing the total power of a logic network, containing one or more circuit elements, subject to timing constraints, the computer-based method comprising the steps of:
   (a) powering down the network such that an overall network delay is increased by DELTA and a total first order power decrease is maximized; and
   (b) powering up the network such that said overall network delay is decreased by said DELTA and said total first order power increase is minimized.

2. The computer-based method of claim 1, wherein step (a) is executed before step (b).

3. The computer-based method of claim 1, wherein step (b) is executed before step (a).

4. The computer-based method of claim 1, further comprises the steps of:
   (c) measuring the total power;
   (d) if said total power remains the same, then reducing said DELTA; and
   (e) repeating steps (a) through (d) until said DELTA is at or below some lower limit.

5. The computer-based method of claim 4, further comprising the step of trading-off said overall network delay for said total power, whereby the logic network's circuit elements operate at minimal total power.

6. The computer-based method of claim 1, further comprising the step of initializing delay-segments of the network by assigning power and/or delay values to said delay-segments so that a given required arrival time is met, and edge-segments are at their largest possible delay.

7. The computer-based method of claim 1, further comprising the step of checking whether a given required arrival time (RAT) can be met, and if not, adjust RAT.

8. The computer-based method of claim 7, where the step of checking further comprises the steps of:
   (i) setting edge-segments to the smallest possible delay;
   (ii) testing the network to determine a network delay.
   (iii) comparing said given RAT to said determined network delay; and
   (iv) increasing said given RAT for sinks that fail to meet said given RAT.

9. The computer-based method of claim 1, further comprises the steps of:
   (c) identifying a cut-set M containing at least one first element of the logic network and powering down said at least one first element; and
   (d) identifying a cut-set L containing at least one second element of the logic network, and powering up said at least one second element.

10. The computer-based method of claim 1, wherein the step (b) of powering up the circuit further comprises the steps of
    (i) determining the power, delay, and dP/dD at an operating point for each edge in a delay graph;
    (ii) establishing timing constraints for said edges;
    (iii) setting up boundary conditions for arrival times for source and sink nodes; and
    (iv) increasing power for each delay-segment to reduce the network delay by said DELTA(SINK) such that said total first order power increase is minimized.

11. The computer-based method of claim 1, wherein the step (a) of powering down the circuit further comprises the steps of
    (i) determining the power, delay, and dP/dD at an operating point for each edge in a delay graph;
    (ii) establishing timing constraints for said edges;
    (iii) setting up boundary conditions for arrival times for source and sink nodes; and
    (iv) decreasing power for each delay-segment to increase the network delay by said DELTA(SINK) such that said total first order power decrease is maximized.

12. A computer-based system for manufacturing integrated chips having one or more logic networks contained thereon, comprising a sub-system for minimizing the total power of the logic networks, the sub-system comprising:
    (1) means for checking whether a given RAT can be met;
    (2) means for initializing delay-segments;
    (3) storing means, for storing data indicative of conditions in the logic network;
    (4) means for setting up DELTA(SINK);
    (5) means for powering up the logic network such that an overall network delay is decreased by DELTA(sink) and a total first order power increase is minimized;
    (6) means for powering down the logic network such that said overall network delay is increased by DELTA(sink) and said total first order power decrease is maximized;
    (7) means for adjusting said DELTA(SINK) and iterating (3) and (4) until said total power of the network is minimized;and
    (8) means for measuring the total power.

13. The computer-based system of claim 12, further comprises means for assigning power and/or delay values to the logic network, whereby said assigned power and/or delay values are used to manufacture the integrated circuit.

14. A computer-based method for minimizing the total power of a logic network system, containing one or more circuit elements each of which consumes an independent resource and a dependent resource in an amount which is a nonlinear function of the amount of the independent resource consumed by the element, the computer-based method comprising the steps of:
    1. defining an object variable equal to the total amount of the dependent resource consumed by the system;
    2. specifying at least one constraint on the allocation of the independent resource among resource-consuming elements of the system;
    3. allocating, tentatively, the independent resource among said resource-consuming elements so as to satisfy said at least one constraint;
    4. identifying a cut-set M containing at least a first element of the system which is subject to said at least one constraint;
    5. perturbing said at least one constraint by perturbing the amount of the independent resource allocated to at least said first element in said set M, so as to improve the value of said object variable of the system by an amount $P_o$;

6. identifying a cut-set L containing at least a second element of the system which is subject to said at least one constraint;

7. restoring said perturbed at least one constraint to its original value by perturbing the amount of the independent resource allocated to at least said second element in said set L, so as to worsen the value of said object variable of the system by an amount less than $P_o$.

15. The computer-based method of claim 14, further comprising:

(a) said object variable has a first gradient representing the change in the value of the object variable for a unit change in the amount of the independent resource consumed by each element in said M cut-set before perturbing the constraint;

(b) said object variable has a second gradient representing the change in the value of the object variable for a unit change in the amount of the independent resource consumed by each element in said L cut-set after perturbing the constraint.

(c) the absolute value of the second gradient is less than the value of the first gradient.

16. The computer-based method of claim 14, wherein steps (4) and (5) comprise perturbing the amount of the independent resource allocated to the elements in the system to maximize the improvement in the value of said object variable; and wherein steps (6) and (7) comprise perturbing the amount of the independent resource allocated to the elements in the system to minimize the worsening of the value of said object variable.

17. The computer-based method of claim 14, further comprises the steps of:

(8) repeating steps (1) through (7) until said dependent resource is minimized.

18. The computer-based method of claim 14, further comprises the steps of:

(8) increasing said at least one constraint; and (9) repeating steps (1) through (8).

19. The computer-based method of claim 14, further comprises the steps of:

(8) decreasing said at least one constraint; and (9) repeating steps (1) through (8).

20. A computer-based method for powering up a logic network, containing one or more circuit elements, subject to timing constraints, the computer-based method comprising the steps of:

(i) assigning a value for DELTA(SINK);

(ii) determining the power, delay, and dP/dD at an operating point for each edge in a delay graph;

(iii) establishing timing constraints for said edges;

(iv) setting up boundary conditions for arrival times for source and sink nodes; and (v) increasing power for each delay-segment to reduce the network delay by said DELTA(SINK) such that said total first order power increase is minimized.

21. A computer-based method for powering down a logic network, containing one or more circuit elements, subject to timing constraints, the computer-based method comprising the steps of:

(i) assigning a value for DELTA(SINK);

(ii) determining the power, delay, and dP/dD at an operating point for each edge in a delay graph;

(iii) establishing timing constraints for said edges;

(iv) setting up boundary conditions for arrival times for source and sink nodes; and (v) decreasing power for each delay-segment to increase the network delay by said DELTA(SINK) such that said total first order power decrease is maximized.

* * * * *